United States Patent

Nagae et al.

[15] 3,663,948
[45] May 16, 1972

[54] APPARATUS FOR CONTROLLING POWER DISTRIBUTION IN SUBSTATION

[72] Inventors: Masaomi Nagae; Sumio Yokowa, both of Kawasaki, Japan

[73] Assignee: Fuji Denki Seizo Kabushiki Kaisha, Kawasaki-shi, Japan

[22] Filed: Oct. 7, 1970

[21] Appl. No.: 78,861

[30] Foreign Application Priority Data

Oct. 11, 1969 Japan..................................44/81339

[52] U.S. Cl................................................323/8, 323/104
[51] Int. Cl.......................................................G05f 1/12
[58] Field of Search.................323/104, 106, 107, 122, 128, 323/8, 108

[56] References Cited

UNITED STATES PATENTS 3,530,370  9/1970  Yamachi et al.......................323/106

Primary Examiner—J. D. Miller
Assistant Examiner—Harry E. Moose, Jr.
Attorney—Holman & Stern

[57] ABSTRACT

An apparatus for controlling voltage flicker in power distribution in a substation, comprising a synchronous condenser, a field adjuster for the synchronous condenser and a compensation circuit, said apparatus being adapted to compensate the distribution voltage flicker due to a large load variation in said substation and being able to adjust a predetermined distribution voltage within an allowable range. The compensation circuit may include an incomplete differential circuit and means for feeding the sum of the products respectively obtained by multiplying the variable part of the respective power of each load and its respective weight coefficient.

3 Claims, 8 Drawing Figures

Patented May 16, 1972

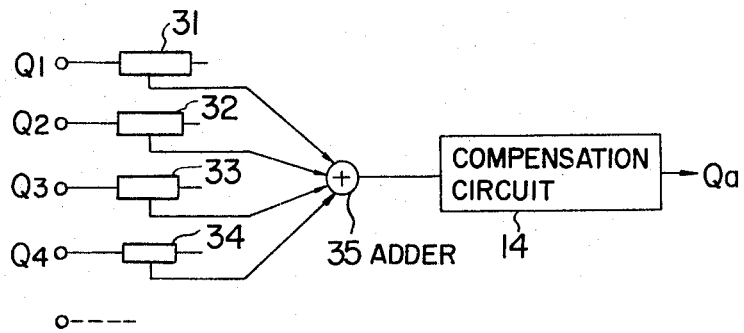
FIG. 3
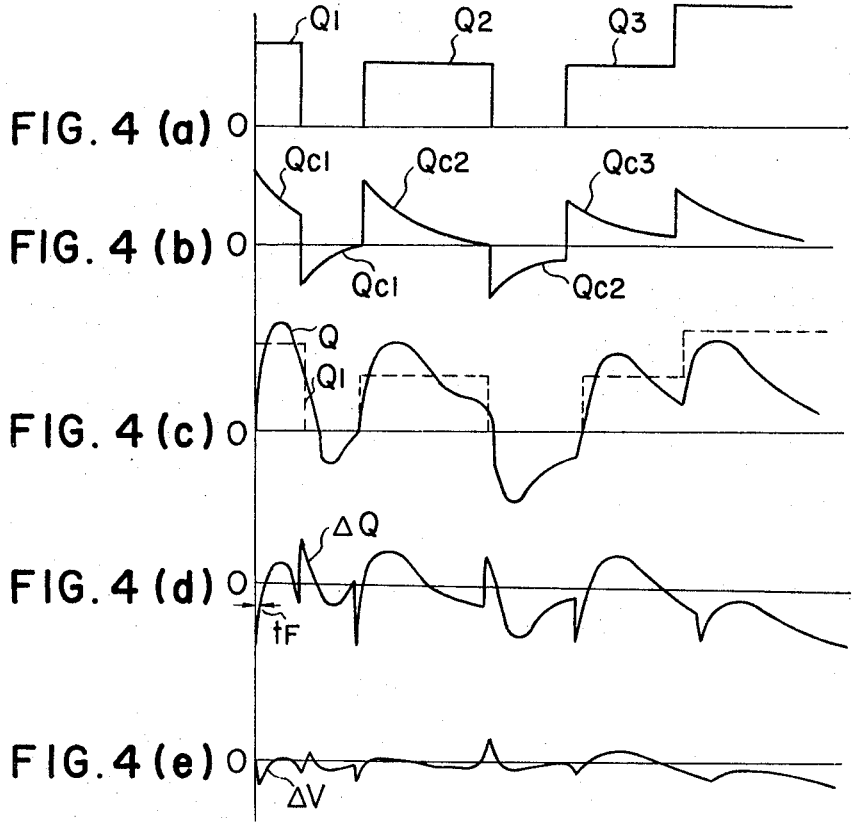
FIG. 4 (a)
FIG. 4 (b)
FIG. 4 (c)
FIG. 4 (d)
FIG. 4 (e)

APPARATUS FOR CONTROLLING POWER DISTRIBUTION IN SUBSTATION

BACKGROUND OF THE INVENTION

The present invention relates to an apparatus for controlling power distribution in a substation, in which a high-impedance power receiving line is provided.

A substation in an ironworks and the like includes large variable loads such as an electric motor for driving a rolling-mill, said motor being accompanied with a large consumption of reactive power during its initial peak load period. However, in the substation as mentioned above, there is a comparatively high impedance in the power receiving line such as the reactance of a transformer thereby causing a momentary voltage drop, namely, the so-called voltage flicker, due to the above-mentioned reactive power. The magnitude of the voltage flicker sometimes reaches several tens of percent above a rated value.

The normal voltage variation may be treated by the operation of an on-load tap-changer attached to a power receiving transformer and by switching-in or switching-off of any power capacitor or reactor for phase-shifting; but a transient voltage flicker cannot be compensated for by these methods.

Here-to-fore, a phase shifting system comprising, in combination, a power capacitor and a synchronous condenser has been adopted to compensate a large variation of reactive power. However, the system mentioned above has only a function to continuously compensate a normal and stable reactive power requirement, but does not serve to compensate any voltage flicker.

SUMMARY OF THE INVENTION

An object of the present invention is to provide a control apparatus adapted to compensate the distribution voltage flicker in a substation, said flicker being due to a large load-variation, by utilizing a synchronous condenser.

Another object of the present invention is to provide a control apparatus which is capable of adjusting a predetermined distribution voltage to an allowable value within a range where the reactive power cannot conveniently be compensated by means of the tap-change of a power receiving transformer or by the use of a power capacitor.

The above and other objects, characteristic features and advantages of the invention will become apparent from the description given below, taken in connection with accompanying drawings, in which the same or equivalent members are designated by the same numerals.

BRIEF DESCRIPTION OF THE DRAWINGS

FIG. 3 is a schematic block diagram showing a detection circuit for the reactive power of a plurality of variable loads; and FIG. 4 illustrates wave forms of electric currents at various parts of a control apparatus according to the present invention.

DETAILED DESCRIPTION OF THE PRESENT INVENTION

According to the present invention, a substation distribution control apparatus comprises a synchronous condenser connected to the substation distribution line, an adjuster adapted to control the output of said synchronous condenser according to a set value of reactive power, and a compensation circuit which receives a variable component of the reactive power due to a variable load and furnishes a compensation quantity to be added to said set value for a short time in response to said variable component.

It is preferable that said compensation circuit comprises an incomplete differential circuit adapted to differentiate the variable component of the reactive power with a time lag thereby to provide a compensation quantity. In this case, the above-mentioned incomplete differential circuit means "a differential circuit having a relatively long differential time constant". For example, it means a differential circuit, the differential time constant of which is 2 or 3 seconds. Thus, the voltage flicker in the initial period of load variation is compensated for thereby decreasing the extent thereof, while for a reactive power variation during the short period of time the reactive power compensation is sufficiently carried out by a control output which remains with a delay of time. Further, in case that the reactive power variation remains for a long period of time, the tap-change of an input transformer or the application of a power capacitor is carried out by variation of the substation voltage, said variation being caused by the gradual decrease of the control output, thereby switching the burden source of the reactive power.

Now, when a number of variable loads are distributed over the substation distribution line through some line impedances, the above-described voltage flicker can be suppressed by compensating the reactive power of a particular variable load. In other words, when taking the voltage flicker into account, the voltage regulation at the power receiving end of the substation becomes an important problem, and a degree of the ultimate the voltage flicker at the receiving end varies according to the type, magnitude and position of each variable load among many variable loads, and to the position of any station auxiliary synchronous electric generator or a synchronous electric motor.

Therefore, in the present invention, the total sum of the products respectively obtained by multiplying the variation component of the reactive power of each load by respective weight coefficient, when a plurality of variable loads are present, is applied as a input of the compensation circuit, whereby the reactive power compensation proportional to the magnitude of a voltage flicker caused by any variable load is assessed and the reactive power supply is effectively conducted from a synchronous condenser so as to suppress the voltage flicker.

Figure 1:
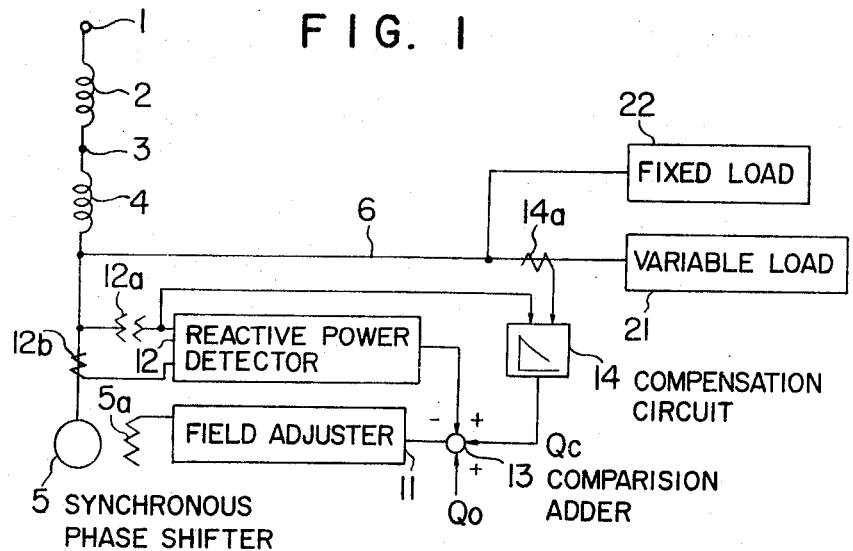
FIG. 1 shows a schematic block circuit of a control apparatus according to the present invention.

With reference to the drawings, and more particularly to FIG. 1 thereof, the circuit comprises a power system bus 1; transmission line reactance 2; a power receiving end 3 of a substation for power distribution; a resultant reactance 4 of power distribution lines such as an input transformer reactance and the like; a synchronous condenser 5; a power distribution line 6; a variable load 21 and a fixed load 22 which are connected to the end of the reactance 4 through said line 6; a field adjuster 11 which excites a field winding 5a of the synchronous condenser 5 thereby to control its reactive output power; a reactive power detector 12 which receives at its input side the voltage and current of the synchronous condenser 5 through an instrument transformer 12a and a current transformer 12b and generates at its output side an actual value of a reactive power proportional to the output of the synchronous condenser 5; a comparison adder 13 in which said actual value is compared with a set value $Q_o$ of the reactive power, the difference obtained by said comparison being fed to said adjuster 11; and a compensation circuit 14 which receives the current of the variable load 21 through a current transformer 14a and a voltage from the instrument transformer 12a, the reactive power being detected from said voltage and current. The compensation circuit 14 has a differential circuit with a large time constant, that is, an incomplete differential circuit which serves to convert the waveform of a detected reactive power. This output is shown by Qc, and is added to the set value $Q_o$ by an adder 13.

Operation of the control apparatus described above will be explained as follows in connection with the waveform of FIG. 4. FIG. 4(a) shows reactive powers $Q_1$, $Q_2$, and $Q_3$ required for variable load, while FIG. 4(b) shows the compensation quantities Qc1, Qc2, and Qc3 obtainable from the compensation circuit by subjecting said reactive powers, respectively, to incomplete differentiation in said compensation circuit.

The transfer function of the incomplete differential circuit included in the compensation circuit can be represented by a formula $F(s) = (sTD/1 + sTD)$, where a time constant $TD$ is selected to be, for instance, 2 - 3 seconds. Therefore, if a rectangular wave such as FIG. 4(a) is applied to the compensation circuit, the waveform of the output of said circuit will be of the exponential form the initial value of which is proportional to the magnitude of the input rectangular wave and is damped at the time constant $TD$ as shown in FIG. 4(b).

The sum of the compensation quantity $Qc$ and the set quantity $Q_o$ is applied to the field adjuster 11. However, the set value $Q_o$ is selected to be a value corresponding to a phase-advancing reactive power which is normally close to zero, the further can be disregarded from the control quantity when dealing with the variable load as shown in FIG. 4(a). Therefore, only the compensation quantity $Qc$ will be taken into account. A voltage approximately proportional to the compensation quantity $Qc$ is supplied to the field winding 5a from the field adjuster 11. As the field winding 5a has normally the delay time constant of approximately 10 seconds, increase of the field current is somewhat delayed, so that the reactive power $Q$ as shown by a solid line in FIG. 4(c) is supplied from the synchronous condenser 5.

The reactive power required by the variable load is of the waveform shown in FIG. 4(a). If this waveform is plotted with a dot line on the wave-form diagram of FIG. 4(c) and the difference between both wave-forms is plotted, the difference will be shown by curve $\Delta Q$ of FIG. 4(d). In this curve $\Delta Q$, the negative part below the time axis is a "short" part which cannot be supplied by the synchronous condenser, while the positive part is an over-compensated part. These "short" and over compensated parts are supplied from or returned to the power system through the reactances 4 and 2 of the substation distribution lines and transmission line shown in FIG. 1, whereby the voltage at the receiving end 3 is lowered or raised.

This voltage regulation is shown in FIG. 4(e), developing a voltage regulation almost proportional to the excess and short reactive power $\Delta Q$. However, in the apparatus according to the present invention, the reactive power of variable load is compensated for as shown in FIG. 4(c) by the synchronous condenser of quick-response excitation, thereby to minimize the time width $tF$ of a part which abruptly varies with the over or short part $\Delta Q$. Such a pulsive reactive power $\Delta Q$ is considerably absorbed by the field energy possessed by a station auxiliary synchronous generator, synchronous motor, and the like which belong to the substation distribution lines. Therefore, the magnitude of the voltage regulation can be suppressed to just over 1 percent, and further such a voltage variation as results from the problem of voltage flicker is not caused.

With reference to Q2 and Q3 of the variable reactive powers in FIG. 4(a), the compensation quantities $Qc2$ and $Qc3$ are damped in the final period, and therefore, the short part still largely remains. However, these should exist as gradually variable quantities and can be adequately supplied by the conventional reactive power control of any synchronous generator. Especially when the reactive power increases stepwise as in the case of Q3 and a voltage drop exceeds a certain value due to the remained short part, the reactive power supply is conducted as a base component by switching the taps of the power receiving transformer or by switching in the power capacitor.

Accordingly, the control apparatus according to the invention serves to compensate only the initial part of the reactive power required by the variable load, and then is expected to be able to apply all its output to the variable part of the reactive power required succeedingly. Therefore, an incomplete differential circuit is made to be included in the compensation circuit, whereby only the initial part of the variable reactive power is compensated for by the synchronous condenser, i.e., only the part causing a voltage flicker is compensated by the synchronous condenser.

Accordingly, the reactive power corresponding to each individual rectangular wave can be used as a compensation quantity without providing the incomplete differential circuit in the compensation circuit in the case where such a rectangular wave of short time width as Q1 in FIG. 4(a) is repeated without duplication in time. In this case, the synchronous condenser generates a reactive power of rectangular wave, and the slightly remaining pulsive "short" region does not cause any voltage flicker as described above.

After compensating one reactive power of rectangular wave, the phase shifter supplies only the base reactive power equivalent to the set value $Q_o$ and is maintained so as to instantly compensate the succeeding reactive power of rectangular wave due to the next variable load.

Figure 2:
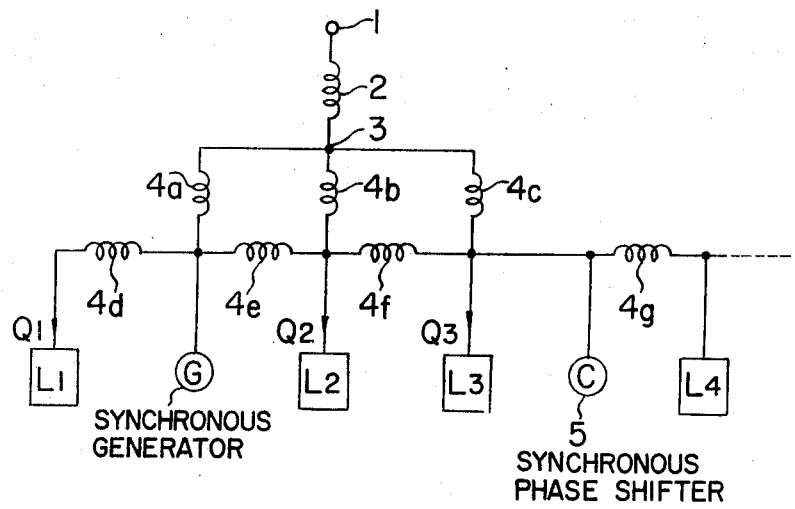
FIG. 2 is a schematic block circuit of an example showing a substation distribution line having a plurality of variable loads.

In the case when there are a number of variable loads, even though these loads are applied at the same time, the degree of influence to these loads on the voltage flicker at the power receiving end varies according to the sort and magnitude of load and to the position of the synchronous machine such as a substation auxiliary generator on the line. For instance, as illustrated in FIG. 2, when a substation distribution line receiving electric power through a transmission line reactance 2 from a power system bus 1 feeds the loads $L_1 - L_4$ through the line reactances $4a - 4g$ such as transformer reactance and the like, if an auxiliary synchronous generator G is located at such a position as shown in FIG. 2, the degree of influence due to the reactive power of each load on the voltage developed at the receiving end 3 becomes small, because the reactive power due to the loads, $L_3$ and $L_4$ in FIG. 2, which loads are fed from the receiving end 3 through lines far from the generator G, is the largest and the reactive power compensation is considerably conducted for the loads $L_1$ and $L_2$ by the generator G located near the loads.

As apparent from the above, the synchronous condenser 5 is preferably arranged near the load whose degree of influence is large. Further, it is preferable, in the compensation circuit to supply signals of such strength as correspond to the degree of influence of the respective loads.

Thus, in the present invention, as shown in FIG. 3, the adjustment of the detecting quantity, namely, the setting of weight coefficient is conducted through the variable resistors 31 to 34 in response to the influence degree with respect to the reactive power from each load. These detecting quantities are added by the adder 35 and led to the compensation circuit 14. Thus, the synchronous condenser supplies the reactive power corresponding to the degree of influence of the variable load on the voltage flicker whenever such variable load is caused,. In the case when the synchronous phase shifter is located far from the variable load influencing the voltage flicker, the reactive power output from the synchronous condenser is not always supplied directly to the corresponding load, and further the synchronous condenser output is not always distributed in response to the set quantity of weight coefficient. Moreover, eventhough the synchronous condenser output were supplied to its nearby load, the compensation of the reactive power for the determined load would be indirectly effected thereby to suppress the generation of voltage flicker.

In this case also, if the continuation of each respective load is for only one or two seconds, it is not required to include the incomplete differential circuit in the compensation circuit. However, in the case when a load continued for more than several seconds is to be handled preferably, the incomplete differential circuit should be so adapted as to shorten the compensation time of the synchronous condenser thereby to be ready for the next variable load.

According to the present invention, the synchronous phase shifter is controlled so as to compensate the reactive power of the variable load influencing the voltage flicker; and further if a number of variable loads are present, the synchronous condenser is operated efficiently for attaining said compensation.

We claim:

1. An apparatus for preventing voltage flicker in power supply to variable loads from a sub-station by using compensation by a synchronous condenser, comprising: a synchronous AC machine; a reactive power detector circuit connected to the synchronous machine and providing a first output signal representing the amount of reactive power the synchronous machine delivers; a compensation circuit means associated with the variable loads and providing a second output signal representing the reactive power of the variable loads; a comparison circuit means with first and second inputs connected to said first and second output signals and having a third input point receiving a predetermined set signal to represent the amount of reactive power required, the comparison circuit including an output signal which is the equivalent of the three inputs thereto; and a field adjuster circuit connected to a field winding of the synchronous machine which adjuster circuit is also connected at an input point thereof to an output of the comparison circuit means, whereby depending on the variable loads, the reactive power output of the synchronous machine acting as a condenser is rendered variable to compensate any voltage drops due to the variable loads, thus preventing voltage flicker.

2. The apparatus as claimed in claim 1 in which the compensation circuit means comprises a differential circuit having a long differential time constant.

3. The apparatus as claimed in claim 1 in which the compensation circuit means includes circuitry associated with a plurality of variable loads and means for feeding into the compensation circuit means a plurality of signals obtained by multiplying a variable reactive part of each said variable load and a respective weight co-efficient.

* * * * *